(12) United States Patent
Bidkar et al.

(10) Patent No.: US 10,190,431 B2
(45) Date of Patent: Jan. 29, 2019

(54) SEAL ASSEMBLY FOR ROTARY MACHINE

(71) Applicant: General Electric Company, Schenectady, NY (US)

(72) Inventors: Rahul Anil Bidkar, Niskayuna, NY (US); Christopher Edward Wolfe, Niskayuna, NY (US); Bugra Han Ertas, Slingerlands, NY (US); Adolfo Delgado Marquez, Niskayuna, NY (US); Nathan Evan McCurdy Gibson, West Chester, OH (US)

(73) Assignee: GENERAL ELECTRIC COMPANY, Schenectady, NY (US)

( * ) Notice: Subject to any disclaimer, the term of this patent is extended or adjusted under 35 U.S.C. 154(b) by 817 days.

(21) Appl. No.: 14/619,246

(22) Filed: Feb. 11, 2015

(65) Prior Publication Data

US 2018/0372229 A1    Dec. 27, 2018

(51) Int. Cl.
*F01D 11/02* (2006.01)
*F16J 15/44* (2006.01)
*F16J 15/447* (2006.01)

(52) U.S. Cl.
CPC ............ *F01D 11/02* (2013.01); *F16J 15/442* (2013.01); *F16J 15/447* (2013.01);
(Continued)

(58) Field of Classification Search
CPC ........ F01D 11/02; F01D 11/025; F01D 11/04; F16J 15/442; F16J 15/445; F16J 15/447;
(Continued)

(56) References Cited

U.S. PATENT DOCUMENTS 3,809,443 A    5/1974    Cherubim
4,223,958 A    9/1980    Gray
(Continued)

OTHER PUBLICATIONS

Grondahl et al., "Film Riding Leaf Seals for Improved Shaft Sealing"; Proceedings of ASME Turbo Expo 2010, Jun. 14-18; Heat Transfer, 2010; 8 pages.
(Continued)

*Primary Examiner* — Nicholas L Foster
(74) *Attorney, Agent, or Firm* — GE Global Patent Operation; Nitin Joshi

(57) ABSTRACT

A seal assembly for a rotary machine is provided. The seal assembly includes a plurality of seal segments disposed circumferentially intermediate to a stationary housing and a rotor, where each of the plurality of seal segments includes a stator interface element and a shoe plate movably supported by the stator interface element. The shoe plate includes one or more labyrinth teeth, a load-bearing surface, and one or more supply ports for facilitating supply of high pressure fluid toward the rotor. In one embodiment, the shoe plate also includes a radially extending portion that is in contact with a portion of the ring movably supported into the stator interface element. In another embodiment, each of the plurality of seal segments includes a plurality of overlapping spring-loaded leaf seal plates in contact with the stator interface element and the radially extending portion. Method of operating the seal segment is also disclosed.

19 Claims, 12 Drawing Sheets

(52) U.S. Cl.
CPC ........ *F01D 11/025* (2013.01); *F05D 2240/55* (2013.01); *F16J 15/441* (2013.01)

(58) Field of Classification Search
CPC ................ F16J 15/4472; F16J 15/4476; F05D 2240/55; F05D 2240/59
See application file for complete search history.

(56) References Cited

U.S. PATENT DOCUMENTS

| | | | |
|---|---|---|---|
| 5,100,158 A | 3/1992 | Gardner | |
| 5,370,402 A | 12/1994 | Gardner et al. | |
| 5,427,455 A | 6/1995 | Bosley | |
| 5,632,493 A | 5/1997 | Gardner | |
| 5,791,868 A | 8/1998 | Bosley et al. | |
| 5,833,369 A | 11/1998 | Heshmat | |
| 5,902,049 A | 5/1999 | Heshmat | |
| 5,915,841 A | 6/1999 | Weissert | |
| 6,505,837 B1 | 1/2003 | Heshmat | |
| 6,527,274 B2 | 3/2003 | Herron et al. | |
| 6,692,006 B2 | 2/2004 | Holder | |
| 6,811,154 B2 | 11/2004 | Proctor et al. | |
| 7,216,871 B1 | 5/2007 | Datta | |
| 7,320,468 B2* | 1/2008 | Morgan | F01D 11/001 277/400 |
| 7,726,660 B2 | 6/2010 | Datta | |
| 8,002,285 B2 | 8/2011 | Justak | |
| 8,172,232 B2 | 5/2012 | Justak | |
| 9,115,810 B2* | 8/2015 | Bidkar | F16J 15/447 |
| 9,255,642 B2* | 2/2016 | Bidkar | F16J 15/447 |
| 9,359,908 B2* | 6/2016 | Bidkar | F01D 11/02 |
| 9,587,746 B2* | 3/2017 | Bidkar | F01D 11/025 |
| 2008/0309019 A1* | 12/2008 | Wolfe | F01D 11/003 277/420 |
| 2009/0058013 A1* | 3/2009 | Bulgrin | F01D 11/001 277/419 |
| 2011/0121519 A1 | 5/2011 | Justak | |
| 2012/0223483 A1 | 9/2012 | Bidkar et al. | |
| 2012/0248704 A1 | 10/2012 | Fennell et al. | |
| 2013/0264775 A1* | 10/2013 | Wolfe | F01D 11/003 277/545 |
| 2014/0008871 A1 | 1/2014 | Bidkar et al. | |
| 2014/0062024 A1 | 3/2014 | Bidkar et al. | |
| 2014/0117624 A1* | 5/2014 | Bidkar | F16J 15/447 277/350 |
| 2014/0119912 A1 | 5/2014 | Bidkar et al. | |
| 2016/0010480 A1* | 1/2016 | Bidkar | F01D 11/02 277/303 |
| 2016/0115805 A1* | 4/2016 | Gibson | F01D 11/025 415/173.5 |

OTHER PUBLICATIONS

Lee et al., "Rotordynamics of a Mechanical Face Seal Riding on a Flexible Shaft", Journal of Tribology, ASME Digital Collection, vol. 116, Issue 2; Apr. 1, 1994; pp. 345-350.

* cited by examiner

SEAL ASSEMBLY FOR ROTARY MACHINE

BACKGROUND

The present application relates generally to a seal assembly for turbo-machinery and more particularly relates to a film riding seal assembly for facilitating sealing in the turbo-machinery.

Various types of turbo-machinery, such as, gas turbine engines, aircraft engines, and steam turbines are known and widely used for applications including power generation, propulsion, and the like. The efficiency of the turbo-machinery depends in part on clearances between the internal components of the turbo-machinery and the leakage of fluids through such clearances. For example, large clearances may be intentionally allowed at certain rotor-stator interfaces to accommodate large, thermally or mechanically-induced relative motions. Leakage of fluid through these clearances from regions of high pressure to regions of low pressure may reduce the efficiency of the turbo-machinery.

Different types of seal assemblies are used to minimize the leakage of the fluid flowing through various clearances in the turbo-machinery. The seal assemblies, however, are often subject to relatively high temperatures, thermal gradients, and thermal and mechanical expansion and contraction during various operational stages that may increase or decrease the clearance therethrough. For example, traditional labyrinth sealing assemblies are assembled to aid very tight clearance during a start-up transient phase. Use of such traditional labyrinth sealing assembly may lead to large clearances during a steady state operation, thereby leading to poor performance in the steady state operation. Moreover, such a tight sealing caused by the traditional labyrinth sealing assemblies in the start-up transient phase may also result in rubbing of the labyrinth sealing assemblies. Whereas, the labyrinth sealing assemblies arranged with large radial clearances (to avoid seals rubs) lead to increased leakage.

There is therefore a desire for improved compliant sealing assemblies for use with the turbo-machinery.

BRIEF DESCRIPTION

In accordance with an embodiment of the invention, a seal assembly for a rotary machine is provided. The seal assembly includes a plurality of seal segments disposed circumferentially intermediate to a stationary housing and a rotor, where each of the plurality of seal segments includes a stator interface element, a portion of a ring movably supported into the stator interface element, and a shoe plate movably supported by the stator interface element. The shoe plate includes one or more labyrinth teeth, a load-bearing surface radially offset from the one or more labyrinth teeth, one or more supply ports formed into the shoe plate for facilitating supply of high pressure fluid toward the rotor, and a radially extending portion that extends toward the stator interface element, where the radially extending portion is in contact with the portion of the ring.

In accordance with an embodiment of the invention, a seal assembly for a rotary machine is provided. The seal assembly includes a plurality of seal segments disposed circumferentially intermediate to a stationary housing and a rotor, where each of the plurality of seal segments includes a stator interface element and a shoe plate movably supported by the stator interface element. The shoe plate includes one or more labyrinth teeth, a load-bearing surface radially offset from the one or more labyrinth teeth, one or more supply ports formed into the shoe plate for facilitating supply of high pressure fluid toward the rotor, and a radially extending portion that extends toward the stator interface element. Each of the plurality of seal segments further includes a plurality of overlapping spring-loaded leaf seal plates in contact with the stator interface element and the radially extending portion of the shoe plate.

In accordance with an embodiment of the invention, a method for operating a seal segment of a seal assembly for a rotary machine having a stationary housing and a rotor is provided. The seal segment includes a shoe plate having a labyrinth tooth, a load-bearing surface, and a radially extending portion that extends toward the stator interface element. The method includes supplying high pressure fluid radially toward the rotor through the load-bearing surface of the shoe plate. The method further includes generating at least one of an aerostatic force or an aerodynamic force between the shoe plate and the rotor based on at least one of the supply of high pressure fluid towards the rotor, a curvature mismatch between the shoe plate and the rotor, and grooves present on the shoe plate or the rotor. The method further includes preventing leakage from a space between the shoe plate and the stator interface element due to a secondary seal that includes one of: a portion of a ring disposed in the stator interface element and in contact with the radially extending portion; or a plurality of overlapping spring-loaded leaf seal plates in contact with the stator interface element and the radially extending portion of the shoe plate.

DRAWINGS

These and other features, aspects, and advantages of the present invention will become better understood when the following detailed description is read with reference to the accompanying drawings in which like characters represent like parts throughout the drawings, wherein.

DETAILED DESCRIPTION

The specification may be best understood with reference to the detailed figures and description set forth herein. Various embodiments are described hereinafter with reference to the figures. However, those skilled in the art will readily appreciate that the detailed description given herein with respect to these figures is just for explanatory purposes as the method and the system extend beyond the described embodiments.

In the following specification and the claims, the singular forms "a", "an" and "the" include plural referents unless the context clearly dictates otherwise. As used herein, the term "or" is not meant to be exclusive and refers to at least one of the referenced components being present and includes instances in which a combination of the referenced components may be present, unless the context clearly dictates otherwise.

Approximating language, as used herein throughout the specification and claims, may be applied to modify any quantitative representation that could permissibly vary without resulting in a change in the basic function to which it is related. Accordingly, a value modified by a term or terms, such as "about", and "substantially" is not to be limited to the precise value specified. Here and throughout the specification and claims, range limitations may be combined and/or interchanged; such ranges are identified and include all the sub-ranges contained therein unless context or language indicates otherwise.

As used herein, the terms "may" and "may be" indicate a possibility of an occurrence within a set of circumstances; a possession of a specified property, characteristic or function; and/or qualify another verb by expressing one or more of an ability, capability, or possibility associated with the qualified verb. Accordingly, usage of "may" and "may be" indicates that a modified term is apparently appropriate, capable, or suitable for an indicated capacity, function, or usage, while taking into account that in some circumstances, the modified term may sometimes not be appropriate, capable, or suitable.

Figure 1:
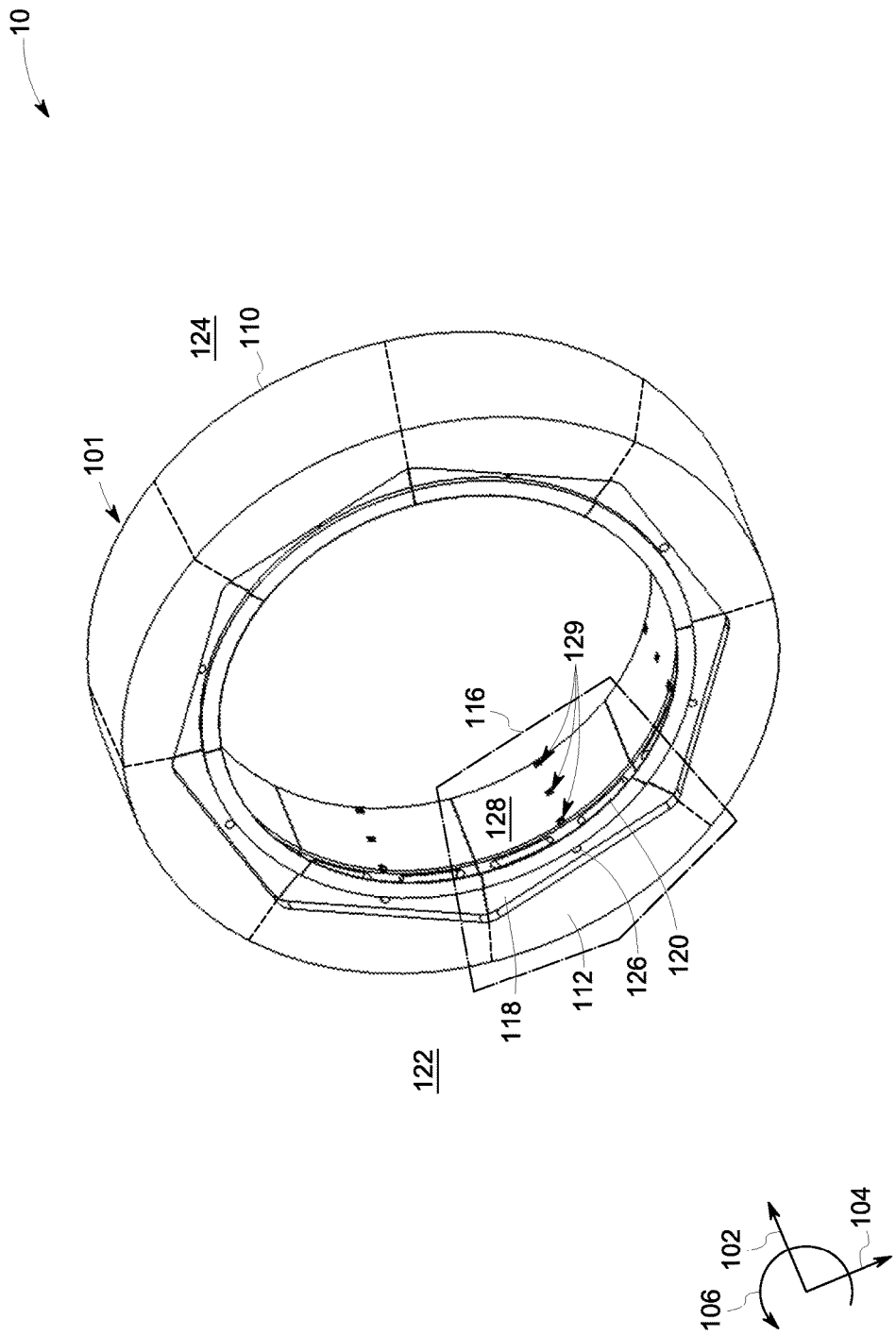
FIG. 1 is a perspective view of a seal assembly for a rotary machine, in accordance with an embodiment of the present specification.

FIG. 1 is a perspective view 10 of a seal assembly 101 for a rotary machine, in accordance with an embodiment of the present specification. In one embodiment, the seal assembly 101 may be a film riding seal assembly. The seal assembly 101 is shown to have an orientation in axial, radial and circumferential direction as represented by numerals 102, 104 and 106, respectively. The seal assembly 101 is circumferentially arranged around a rotor (not shown) that is axially located in the rotary machine such that the seal assembly 101 is intermediate to a stationary housing 110 and the rotor (not shown). The stationary housing 110 includes a plurality of stator interface elements such as a stator interface element 112 that form a radially outwards region of the seal assembly 101.

The seal assembly 101 further includes a plurality of seal segments such as a seal segment 116 (see FIG. 2 for a detailed view) located adjacent to each other and disposed circumferentially intermediate to the stationary housing 110 and the rotor. Each of the seal segment 116 includes a stator interface element 112 and a shoe plate 118 located proximate to the rotor. The shoe plate 118 may be movably supported by a corresponding stator interface element 112 of the plurality of stator interface elements. During an operation of the rotary machine, the shoe plate 118 rides on a fluid film formed between the shoe plate 118 and the rotor.

Figure 2:
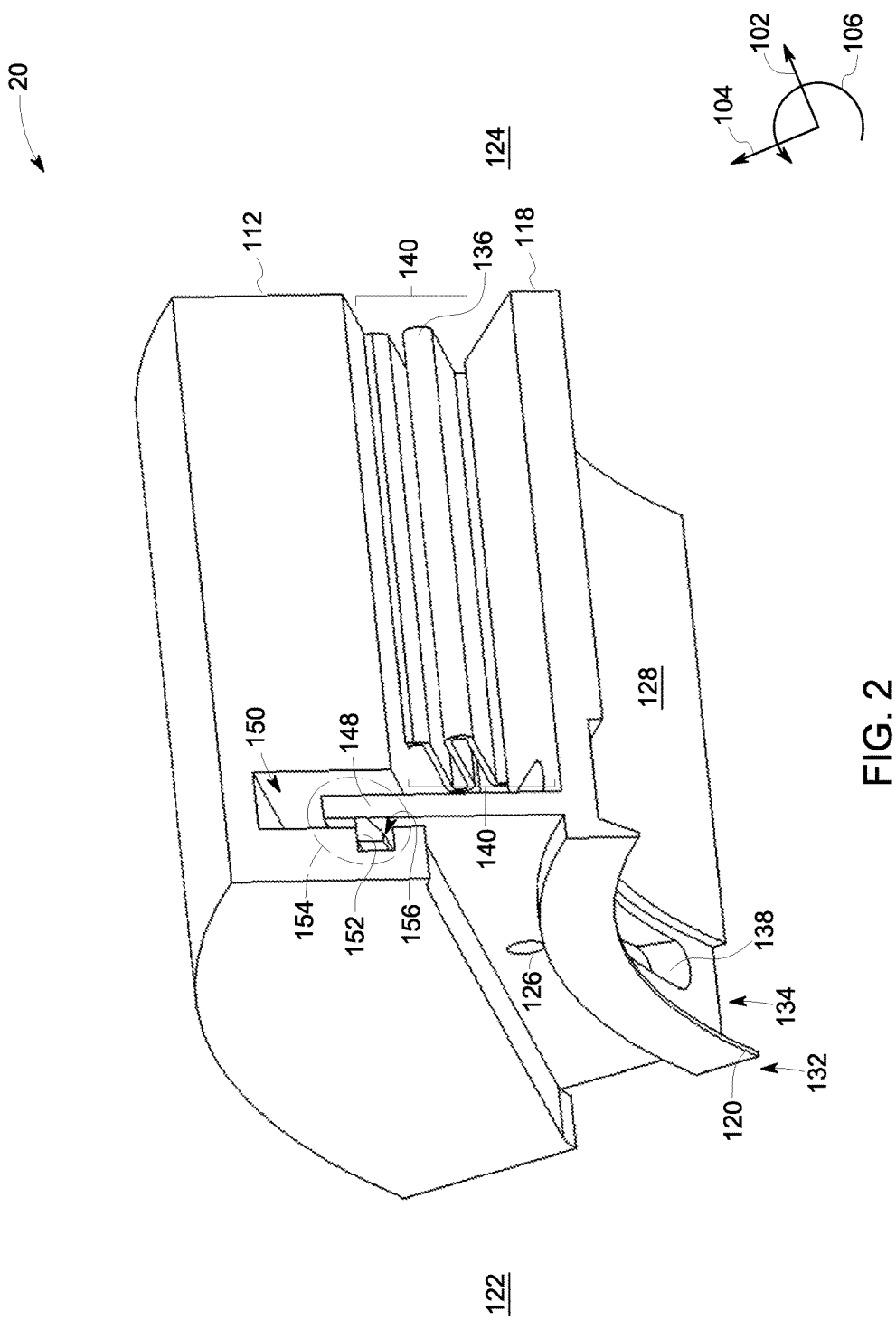
FIG. 2 is a perspective view of a seal segment, in accordance with an embodiment of the present specification.

The shoe plate 118 may include one or more labyrinth teeth such as a labyrinth tooth 120 at a side facing the rotor surface. In the embodiment of FIG. 2 only one labyrinth tooth 120 is shown, however, embodiments having more than one labyrinth teeth are also contemplated. In one embodiment, the labyrinth tooth 120 may be located towards forward-most region of the shoe plate 118. The labyrinth tooth 120 is employed to substantially separate a high pressure region 122 from a low pressure region 124 on either sides of the seal assembly 101 of the rotary machine.

Each shoe plate 118 may also include one or more supply ports such as a supply port 126 for facilitating a flow of high pressure fluid toward a rotor of the rotary machine. Although FIG. 1 depicts one supply port 126 per each seal segment 116, use of more than one supply ports is also contemplated. Furthermore, each of the shoe plate 118 may include a load-bearing surface 128 facing the rotor of the rotary machine. The load-bearing surface 128 may include one or more openings 129. In one embodiment, each of the supply port 126 may discharge the high pressure fluid toward the rotor via the one or more openings 129. Further details of the supply port 126, the load-bearing surface 128, and the openings 129 will be described later in the description.

Moreover, the seal assembly 101 may also include a secondary seal (not shown in FIG. 1) configured to reduce/stop leakage of fluid from a space between the stator interface element 112 and the shoe plate 118. Details of the secondary seals will be described later in the description.

FIG. 2 is a perspective view 20 of the seal segment 116, in accordance with an embodiment of the present specification. FIG. 2 will be explained in conjunction with FIG. 1. As previously noted, the seal segment 116 includes the stator interface element 112, the shoe plate 118 movably supported by the stator interface element 112, the labyrinth tooth 120 and the load-bearing surface 128 facing the rotor. The shoe plate 118 is configured to allow a high pressure fluid from the high pressure region 122 to an upstream portion 132 of forward-most labyrinth tooth 120 and a low pressure fluid from the low pressure region 124 to a downstream portion or cavity 134 of the aft-most labyrinth tooth 120.

The load-bearing surface 128 may be located radially offset from the labyrinth tooth 120. The load-bearing surface 128 is configured to generate radial aerostatic-aerodynamic force between the shoe plate 118 and the rotor. In one embodiment, the load-bearing surface 128 may be coated with lubricating coatings to minimize unintentional rubs between the shoe plate 118 and the rotor. Examples of the lubricating coatings may include, but are not limited to PS304 or PS400 (developed by NASA). In some embodiments, lubricants used in the lubricating coatings may be embedded in hard materials to balance the lubrication, wear and thermal growth properties of the coating. Such, hard materials may include, but are not limited to graphite or diamond-like carbon, hexagonal boron nitride, chromium molybdenum nitride, chrome titanium aluminum nitride or combinations thereof. Moreover, in certain embodiments, surface of the rotor interfacing with the load-bearing surface 128 may be coated with materials, including but not limited to, chromium carbide, titanium aluminum nitride, hexagonal boron nitride, and the like to improve hardness, corrosion resistance, and an ability to maintain a good surface finish of the surface of the rotor.

The seal segment 116 may also include one or more flexible elements such as the flexible element 136 disposed between the shoe plate 118 and the stator interface element 112 to aid in the radial movement of the shoe plate 118 relative to the stator interface element 112. In one embodiment, two (see FIG. 4) such flexible elements may be disposed between the shoe plate 118 and the stator interface element 112 of which only one is visible in the perspective view of FIG. 2. It is to be noted that the present specification is not limited with respect the specific number of flexible elements.

The flexible element 136 may provide radial compliance and/or rotational rigidity about the circumferential and axial directions 106, 102. The purpose of the flexible element 136 is to support the shoe plate 118 with radial, tangential and axial stiffness properties and guide the motion of the shoe plate 118 relative to the stator interface element 112. Non-limiting examples of the flexible elements may include bellow springs, flexures, or other spring-like elements including flexible beams, leaf springs or coil springs.

In the embodiment of FIG. 2, the flexible element 136 includes a bellow. The radial stiffness of the bellow may be controlled by changing one or more of an axial width, a tangential width, a thickness of the bellow, and spacing between the bellow turns and the material for the bellow springs. In one embodiment, the bellows are formed from Inconel X750 or Rene41 or similar high temperature alloys or in the case of low temperature applications will be made from an appropriate metal or composite material. The bellow may be formed from sheet metal and brazed to the stator interface element 112 and the shoe plate 118 or could be fabricated by a machining process like wire EDM.

As shown in FIG. 2, the shoe plate 118 may further include one or more crossover holes such as a crossover hole 138. The crossover hole 138 may be located axially downstream of the aft-most labyrinth tooth 120. The crossover hole 138 aids in allowing a flow of a low pressure fluid from the downstream portion 134 of the aft-most labyrinth tooth 120 to a rear cavity 140. The rear cavity 140 may be defined by the space between the stator interface element 112 and the shoe plate 118. In one embodiment, the crossover hole 138 may be angled for allowing the flow of the low pressure fluid in a radial direction from behind the labyrinth tooth 120 into the rear cavity 140. In another embodiment, the crossover hole 138 is angled for allowing the flow of the low pressure fluid in a circumferential direction causing the low pressure fluid to swirl as the low pressure fluid transfers from behind the labyrinth tooth 120 to radially above the shoe plate 118. Such swirl in the low pressure fluid may cause the low pressure fluid to gain tangential velocity in a direction of rotation of the rotor or opposite to the direction of rotation of the rotor.

Figure 3:
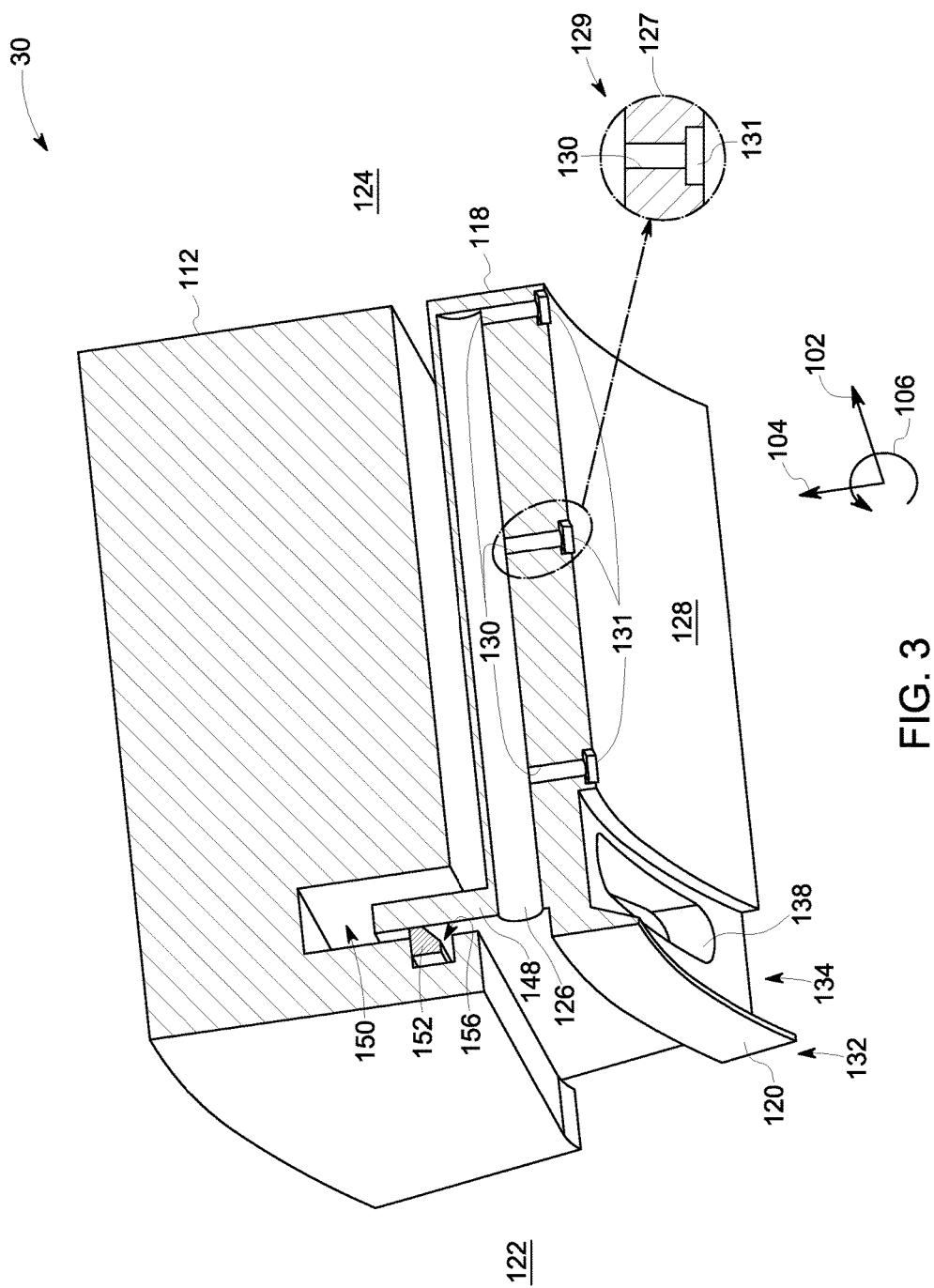
FIG. 3 is a cross-sectional view of the seal segment of FIG. 2, in accordance with an embodiment of the present specification.

Moreover, as previously noted, the shoe plate 118 also includes one or more supply ports (only one supply port 126 is shown in FIG. 2). The supply port 126 may be formed axially in the shoe plate 118 for facilitating supply of the high pressure fluid toward the rotor. In one embodiment, the supply port 126 discharges the high pressure fluid toward the rotor via the openings 129 (shown in FIG. 1 and FIG. 3) formed in the load-bearing surface 128. FIG. 3 is a cross-sectional view 30 of the seal segment 116 of FIG. 2, in accordance with an embodiment of the present specification. In one embodiment, as shown in FIG. 3, each supply port such as the supply port 126 discharges the high pressure fluid toward the rotor via three openings 129. Each of the openings 129 includes a feed port 130 and a counter bore 131 formed in the shoe plate 118 as depicted in an enlarged view 127. In some embodiments, as depicted in the enlarged view 127, the diameter or width of the counter bore 131 may be greater than the diameter or width of the feed port 130. Although the embodiment of FIG. 3 depicts three feed ports 130 and three counter bores 131, embodiments having lesser or greater number of feed ports and counter bores have also been contemplated. It is to be noted that embodiments of the present specification are not limited to the specific positioning of the feed ports 130 and counter bores 131, as depicted in FIG. 3. Also, embodiments with one or more feedports 130 but no counter bores have also been contemplated.

The feed ports 130 and counter bores 131 may be arranged such that the aerostatic-aerodynamic pressure distribution may cause a uniform lift of the shoe plate 118 without any front-aft tilting. For example, the three feed ports 130 and counter bores 131 disposed at forward, center, and aft locations in the load-bearing surface 128, as depicted, may facilitate uniform lift of the shoe plate 118 without any front-aft tilting of the shoe plate 118.

In one embodiment, the seal assembly 101 and hence the seal segment 116 may be configured in a line-on-line configuration with the rotor (i.e., without a gap between the shoe plate 118 and the rotor). During the initial start-up phase, the flow of the high pressure fluid through the feed ports 130 and counter bores 131 toward the rotor may cause an opening force that moves the shoe plate 118 radially outwards by a predefined distance, such as about 0.0005 inch to about 0.002 inch. This initial lift of the shoe plate 118 may be important for the seal segments to avoid damaging the shoe plate 118 due to contact by the rotor at low speeds when the fluid film does not possess sufficient aerodynamic strength to lift the shoe plate 118. Following such initial lift-off, the shoe plate 118 may find an equilibrium position away from the rotor. The equilibrium force balance for this embodiment where the shoe plate 118 starts with a zero gap between the shoe plate 118 and the rotor is described later.

In yet another embodiment, the seal assembly 101 and hence the seal segment 116 may be arranged to have a non-zero gap between the shoe plate 118 and the rotor at start. In this case, during the start-up phase, the shoe plate 118 moves radially inwards towards the rotor under the influence of a closing force. Moreover, after this radially inwards motion, the shoe plate 118 may find an equilibrium riding clearance away from the rotor. The equilibrium force balance for this embodiment where the shoe plate 118 starts with a non-zero gap between the shoe plate 118 and the rotor is described later.

Certain physical characteristics such as a curvature (see FIG. 4) of the shoe plate 118, grooves (not shown), Rayleigh steps (see FIG. 5), pockets (not shown) formed in the load-bearing surface 128, and/or pockets/grooves formed on the rotor may aid in creating aerodynamic force between the shoe plate 118 and the rotor. Additionally, the flow of high pressure fluid through feed ports 130 and counter bores 131 may also create an aerostatic force between the shoe plate 118 and the rotor. Consequently, the shoe plate 118 maintains an equilibrium clearance away from the rotor in the non-contact or the film-riding mode due to a combination of the aerodynamic and the aerostatic forces.

Figure 4:
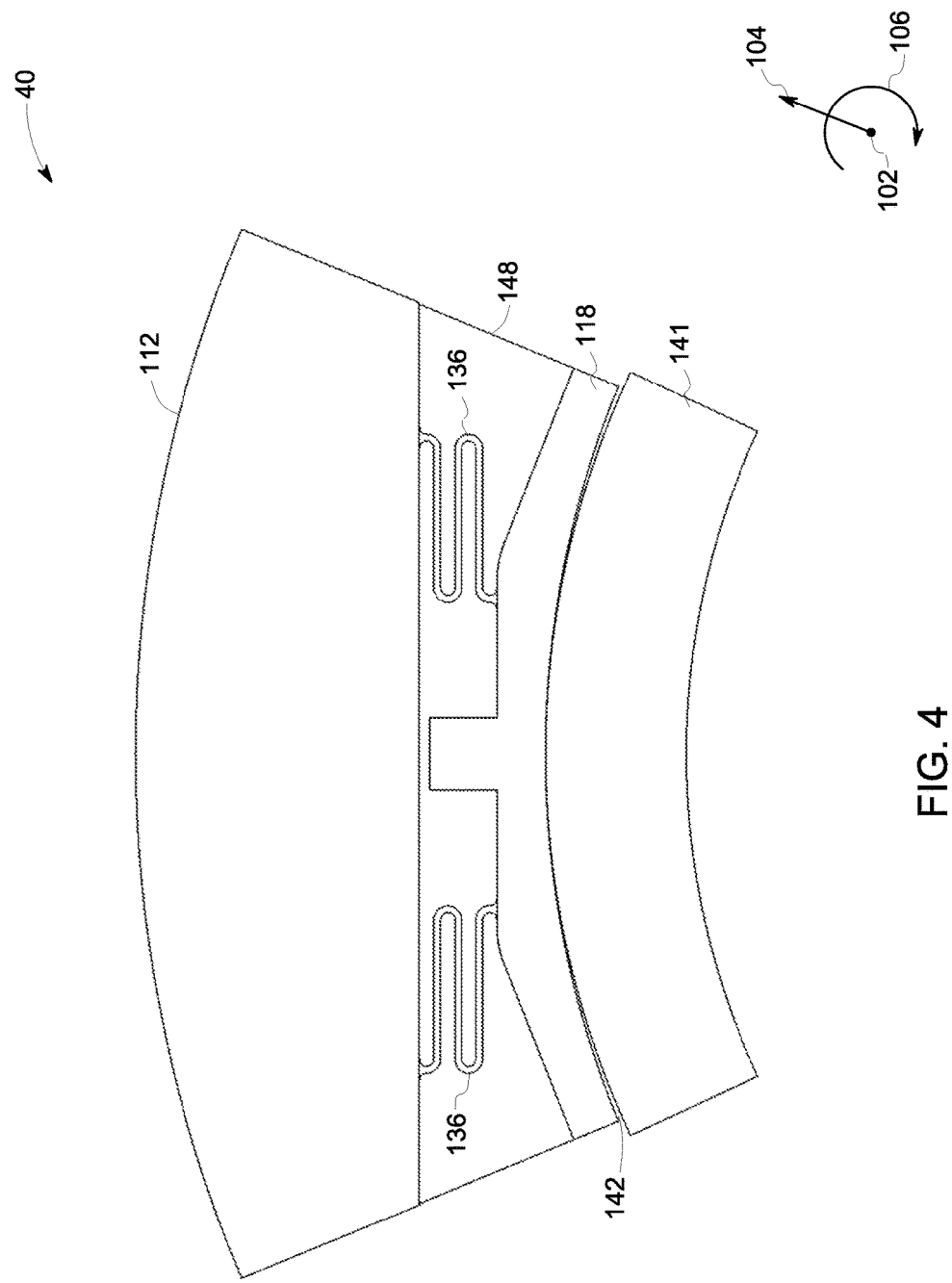
FIG. 4 is a perspective view depicting a shoe-rotor curvature for a seal segment, in accordance with an embodiment of the present specification.

FIG. 4 is a perspective view 40 depicting a shoe-rotor curvature for the seal segment 116, in accordance with an embodiment of the present specification. The shoe-rotor curvature as depicted in FIG. 4 may aid in creation of an aerodynamic force. In particular, in the presence of rotational speed and when the gap between a rotor 141 and the shoe plate 118 is small (typically 0.0003 inch to 0.002 inch), a thin fluid film 142 builds an additional pressure. In this embodiment, the radius of curvature of the shoe plate 118 may be intentionally machined to be larger than the radius of the rotor 141 to achieve a required curvature mismatch. Consequently, the fluid film 142 having either monotonically converging or converging-diverging in the direction of rotation may be formed. This fluid film 142 in a form of fluid wedge may cause an additional pressure to build-up due to a negative gradient in the thickness of the fluid film 142 in the direction of rotation. The additional pressure caused by the thin fluid film 142 keeps the shoe plate 118 from contacting the rotor 141.

Figure 5:
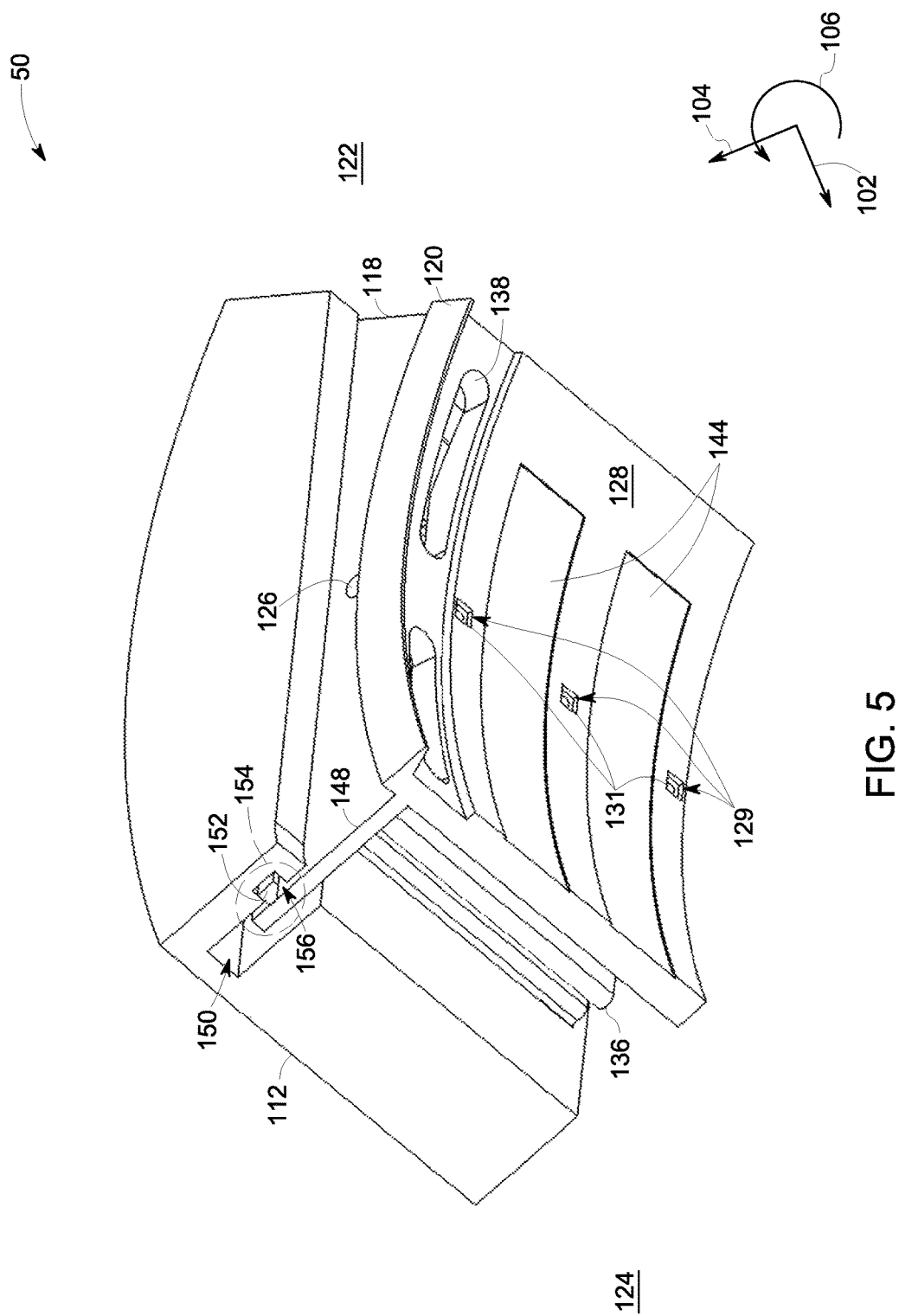
FIG. 5 is a perspective view depicting Rayleigh steps on a load-bearing surface of a seal segment, in accordance with an embodiment of the present specification.

FIG. 5 is a perspective view 50 depicting Rayleigh steps 144 in the load-bearing surface 128 of the seal segment 116, in accordance with an embodiment of the present specification. In the presence of rotational speed, the thin fluid film 142 may generate additional aerodynamic force due to the presence of the Rayleigh steps 144. Although, the Rayleigh steps 144 have been shown in the embodiment of FIG. 5, other features such as grooves and/or pockets (not shown) may also be formed in the load-bearing surface 128. Additionally, features like grooves and/or pockets may also be present on the rotor (not shown in FIG. 5).

The features of the curvature mismatch (FIG. 4), the Rayleigh steps on the load-bearing surface (FIG. 5), the pockets and/or grooves on the load-bearing surface, and/or the pockets and/or grooves on the rotor give rise to aerodynamic forces that are active in the presence of a combination of non-zero rotational speed and small fluid film gaps (typically 0.0003 inch to 0.002 inch).

Figure 6:
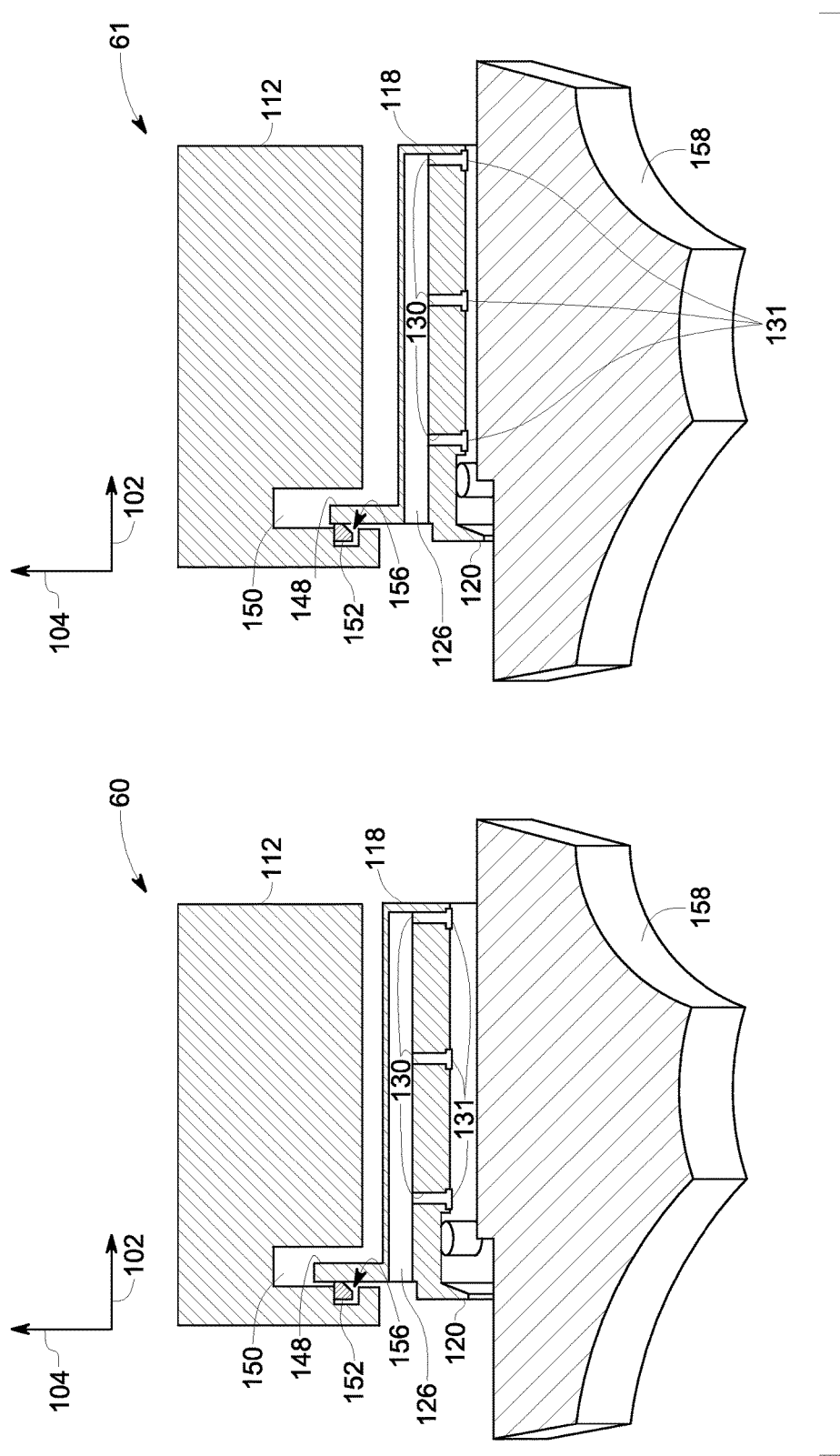
FIG. 6 depicts cross-sectional views of a seal segment, in accordance with embodiments of the present specification.

Referring again to FIG. 2 and FIG. 3, and FIG. 6, the thin fluid film 142 may also generate an additional aerostatic force due to the presence of the feed ports 130 and counter bores 131. FIG. 6 depicts cross-sectional views (60 and 61) of the seal segment 116 and a rotor such as a stepped rotor 158, in accordance with embodiments of the present specification. More particularly, the presence of the feed ports 130 or the presence of feed ports 130 and counter bores 131 leads to gap-dependent feedback characteristics as described herein with the aid of FIG. 6. It is to be noted that the description provided in the context of FIG. 6 is for an embodiment when both the feed port 130 and counter bore 131 are present, however, the same description may also be applicable for an embodiment when only the feed ports 130 are present and counter bores 131 are not present. Each of the feed ports 130 may be sized in diameter and radial height such that when the fluid film 142 between the shoe plate 118 and the rotor 158 is large (typically larger than 0.005 inch as exaggeratedly shown in the cross-sectional view 60), the radially outer end of the feed port 130 has high pressure fluid and the radially inner end of the feed port 130 and counter bore 131 has low pressure fluid. The pressure drops from about $P_{high}$ to about $P_{low}$ across the feed port 130 leading to a pressure distribution dominated by low pressure on the load-bearing surface 128.

However, when the gap between the shoe plate 118 and the rotor 158 is small (typically smaller than 0.003 inch as exaggeratedly shown in the cross-sectional view 61), the fluid film 142 may become a choke point (i.e. the point across which the pressure drop occurs). Consequently, high pressure is developed on the radially inner end of the feed port 130 and the counter bore 131. This high pressure fluid at the radially inner end of the feed port 130 and counter bore 131 modifies the pressure distribution on the load-bearing surface 128 to generate additional aerostatic force. This aerostatic force increases in magnitude as the fluid film 142 becomes thinner and leads to gap-dependent feedback characteristics for a radially outward force on the load-bearing surface 128. The absence of counter bores 131 may create qualitatively similar force-gap characteristics but slightly lower in magnitude compared to the case where counter bores 131 are present.

The additional pressure created on the load-bearing surface 128 due to the presence of feed ports 130 and counter bores 131 depends on the presence of pressurized fluid, the dimensions of the feed ports 130, the dimensions of counter bores 131 and the gap between the shoe plate 118 and the rotor 158. This additional pressure may be present even in the absence of rotational speed.

Overall, the presence of the feed ports 130 and counter bores 131, the curvature mismatch between the rotor and shoe plate 118 (as depicted in FIG. 4), the Rayleigh steps 144 (as depicted in FIG. 5), the grooves, and/or pockets allow the fluid film 142 between the spinning rotor and the load-bearing surface 128 to generate a combination of aerostatic and aerodynamic force. The combined aerostatic force and the aerodynamic force may have feedback characteristics such that a smaller running clearance generates a larger force. Such feedback characteristics allow the shoe plate 118 to find an equilibrium running clearance such that the force and moments generated by the fluid film 142 can support the net closing force & net moment load on the shoe plate 118. Thus, the shoe plate 118 rides on the fluid film 142 (non-contact operation) such that the radially inwards aerostatic closing force, the radially outwards aerostatic-aerodynamic film force, the spring and/or friction resistances are in equilibrium. A detailed force balance is described later.

The shoe plate 118 further includes a radially extending portion 148 that extends toward the stator interface element 112. Moreover, a slot 150 may be formed in the stator interface element 112 to accommodate a radial movement of the radially extending portion 148 relative to the stator interface element 112. In one embodiment, the radially extending portion 148 may be configured to remain in contact with a portion of a ring 152 that may be disposed in a slot 156 in the stator interface element 112. Such a contact between the radially extending portion 148 and the portion of the ring 152 may act as a secondary seal 154 for stopping or reducing leakage of fluid through an interface between the shoe plate 118 and the stator interface element 112. During an operation of the seal assembly 101, upon pressurization, a differential pressure urges the portion of the ring 152 axially towards the radially extending portion 148 and radially outwards into the slot 156 of the stator interface 112.

In one embodiment, the ring 152 may be a continuous ring. For example, the ring 152 may be a 360 degree circular ring or a continuous multi-sided polygon with number of sides equal to the number of seal segments. In another embodiment, the ring 152 may be a segmented ring formed by multiple portions equal to the number of seal segments, where each portion of the ring 152 is disposed in corresponding stator interface element 112.

Figure 7:
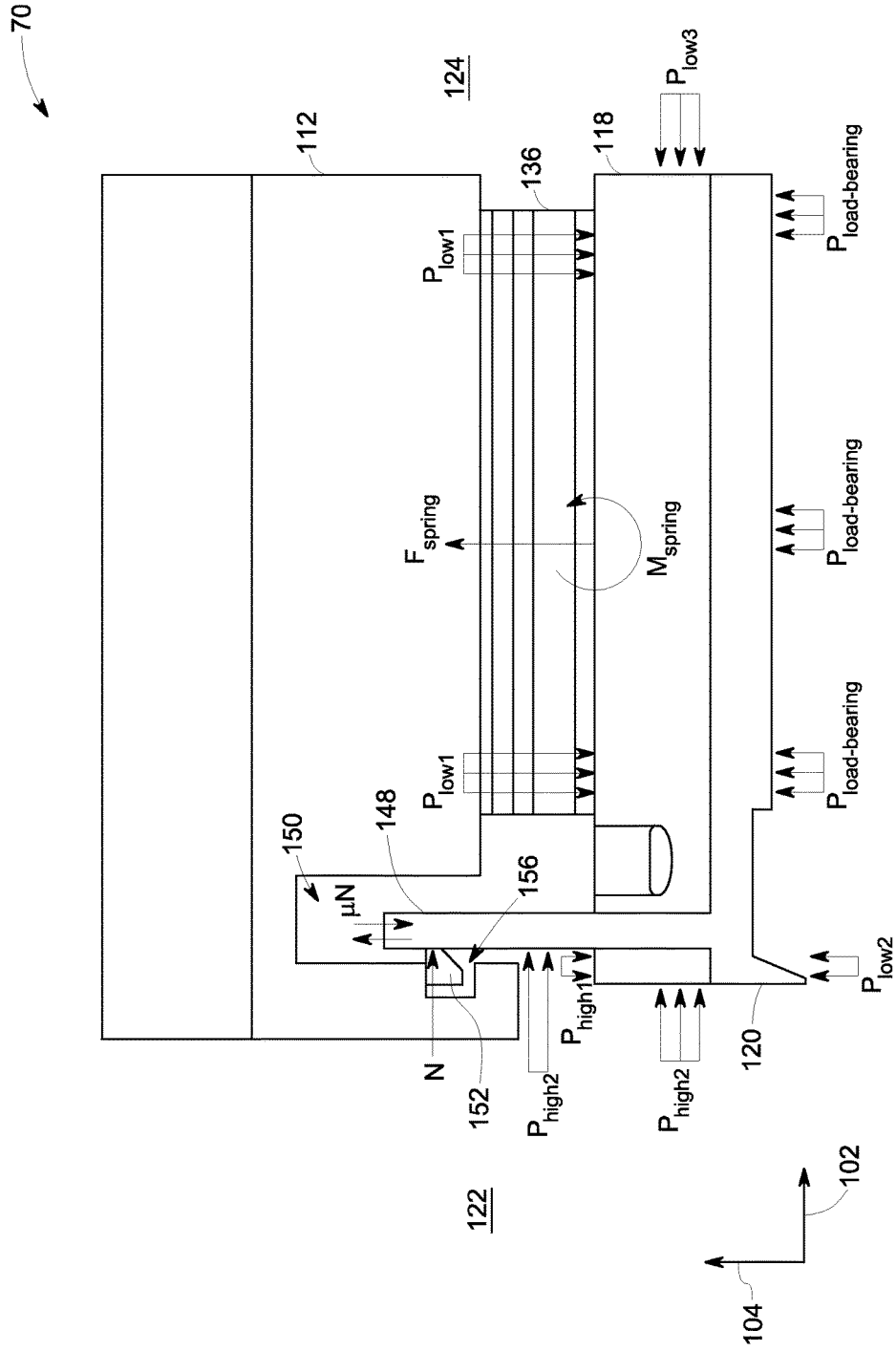
FIG. 7 is a side view of a seal segment illustrating various pressure forces acting on a shoe plate, in accordance with an embodiment of the present specification.

FIG. 7 is a side view 70 of the seal segment 116 illustrating various forces acting on the shoe plate 118, in accordance with an embodiment of the present specification. The crossover hole 138 allows introduction of low pressure air into the cavity 140 and cavity 134 downstream of the aft-most labyrinth tooth 120.

The presence of the crossover hole 138 allows the load-bearing surface 128 (non-rotor-facing side) to experience a low pressure (denoted by $P_{lowl}$). The load-bearing surface 128 (rotor-facing side) experiences $P_{load\text{-}bearing}$. A combination of low-pressure in cavity 134 and large thickness of fluid film 142 (larger than about 0.005 inch) causes $P_{load\text{-}bearing}$ to be almost equal to $P_{lowl}$. Thus, at large thickness of the fluid film 142 (larger than about 0.005 inch), the rotor-facing side and the non-rotor facing side of the shoe plate 118 experience $P_{low1}$, thereby resulting in an almost zero net force on the shoe plate 118 for axial locations downstream of the radially extending wall 148. The portion of the shoe plate 118 axially upstream of the radially extending wall 148, experiences a high pressure (denoted by $P_{high1}$) on the non-rotor facing side whereas a low pressure (denoted by $P_{low2}$) on the rotor facing side, thereby resulting in a radially inward closing force upon pressurization. Apart from this net closing force, the shoe plate 118 experiences an axial load (denoted by $P_{high2}$ and $P_{low3}$) due to pressure differential, a contact force at the contact of the portion of the ring 152 and the radially extending portion 148, and a radial spring force (denoted by $F_{spring}$) & springs moments (denoted by $M_{spring}$) about different axes. The contact force between the portion of the ring 152 and the radially extending portion 148 is a combination of an axial force N and a radial friction resistance force IN. The axial force N may be adjusted using various friction coatings at the interface of the portion of the ring 152 and the slot 156. Moreover, the axial force N may also be adjusted by modifying a pressure-loaded area of the ring 152 (i.e. by changing a chamfer dimension of the ring 152).

Under the influence of the closing force (caused by the difference in $P_{high1}$ and $P_{low2}$), the spring resistance ($F_{spring}$ and $M_{spring}$), and the friction force (N), the shoe plate 118 moves radially inwards towards the rotor. The radially inwards motion continues until the fluid film 142 between the shoe plate 118 and the rotor becomes thin enough to generate a combined aerostatic-aerodynamic force acting in the radially outwards direction. As described earlier, the aerostatic-aerodynamic force (i.e., $P_{load-bearing}$ larger than $P_{low1}$) is caused at small gaps (e.g., when the fluid film 142 smaller than about 0.003 inch) due to the presence of some combination of feed ports 130, counter bores 131, curvature mismatch, Rayleigh steps, and/or grooves on the rotor or the shoe plate 118.

For instances where the seal starts with an initial contact with the rotor (i.e., in case of line-on-line arrangement when the thickness of fluid film 142 is zero), the force balance described above is valid except the starting value of $P_{load-bearing}$ may not be equal to $P_{low1}$. Unlike the embodiment described above, upon pressurization, $P_{load-bearing}$ is larger than $P_{low1}$ because of the zero fluid film thickness 142. This leads to a radially outwards opening force, which after overcoming the closing force (present on the front portion of the shoe due to the difference $P_{high1}$ and $P_{low2}$), the friction force ($\mu$N), the spring force ($F_{spring}$) may cause the shoe plate 118 to move radially outwards till an equilibrium gap is attained. At equilibrium, the balance of forces is identical to the one described earlier.

Figure 8:
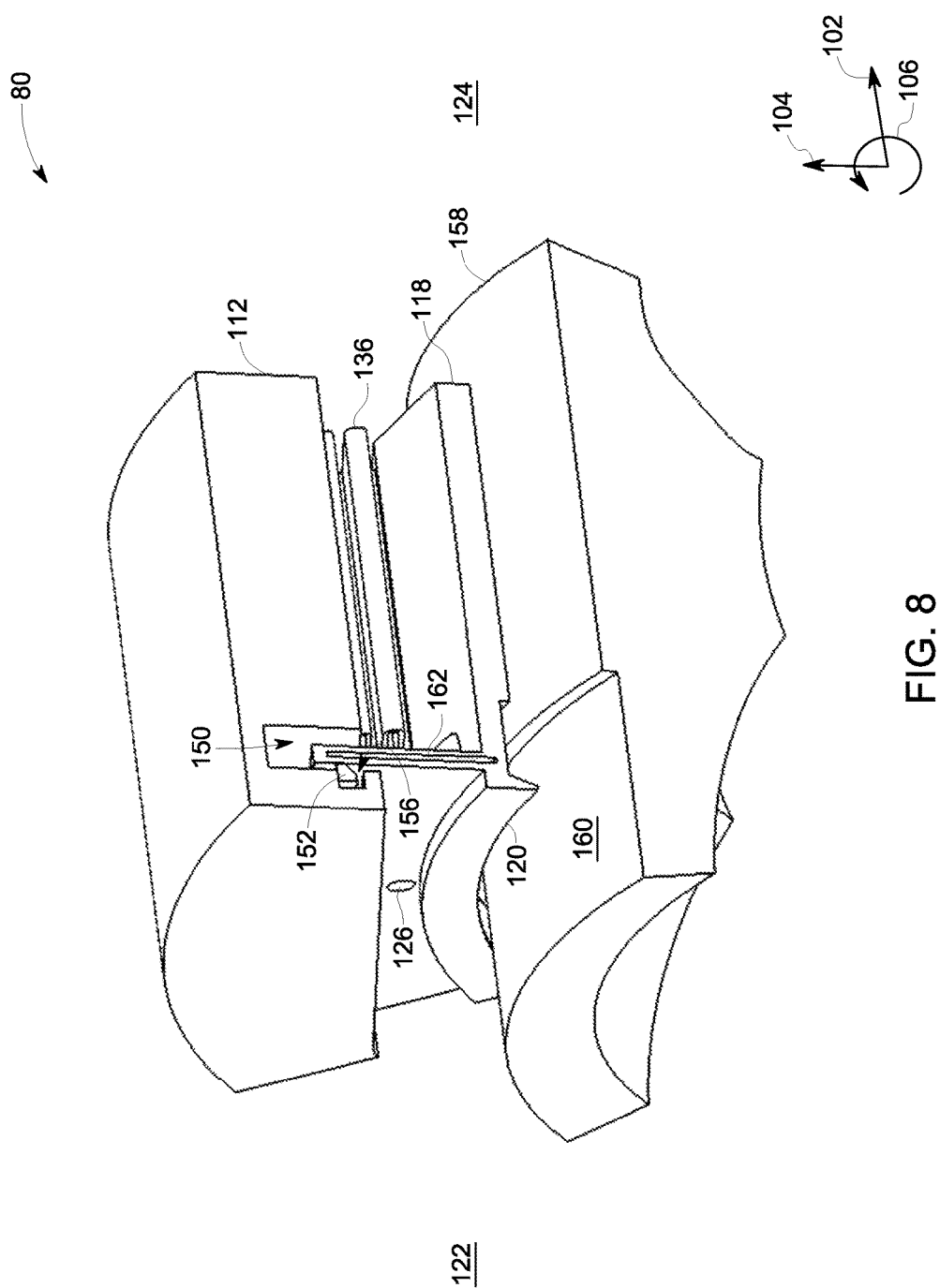
FIG. 8 is a perspective view of a seal segment riding over a stepped rotor, in accordance with an embodiment of the present specification.

FIG. 8 is a perspective view 80 of the seal segment 116 riding over the stepped rotor 158, in accordance with an embodiment of the present specification. The rotor 158 includes a stepped section 160 towards a high pressure side 122 of the rotary machine. The stepped section 160 includes a portion of the rotor 158 with locally decreased radius for a predefined length. The stepped section 160 may aid in reducing an axial momentum of a flow of fluid across the labyrinth tooth 120 of the shoe plate 118 from the high pressure side 122 to the low pressure side 124. This reduction in the axial momentum allows for reliable operation of the seal assembly 101.

Additionally, the radially extending portion 148 may also include one or more slots such as a slot 162 on at least one side for allowing disposal of at least one spline seal shim for reducing leakage between neighboring seal segments.

Figure 9:
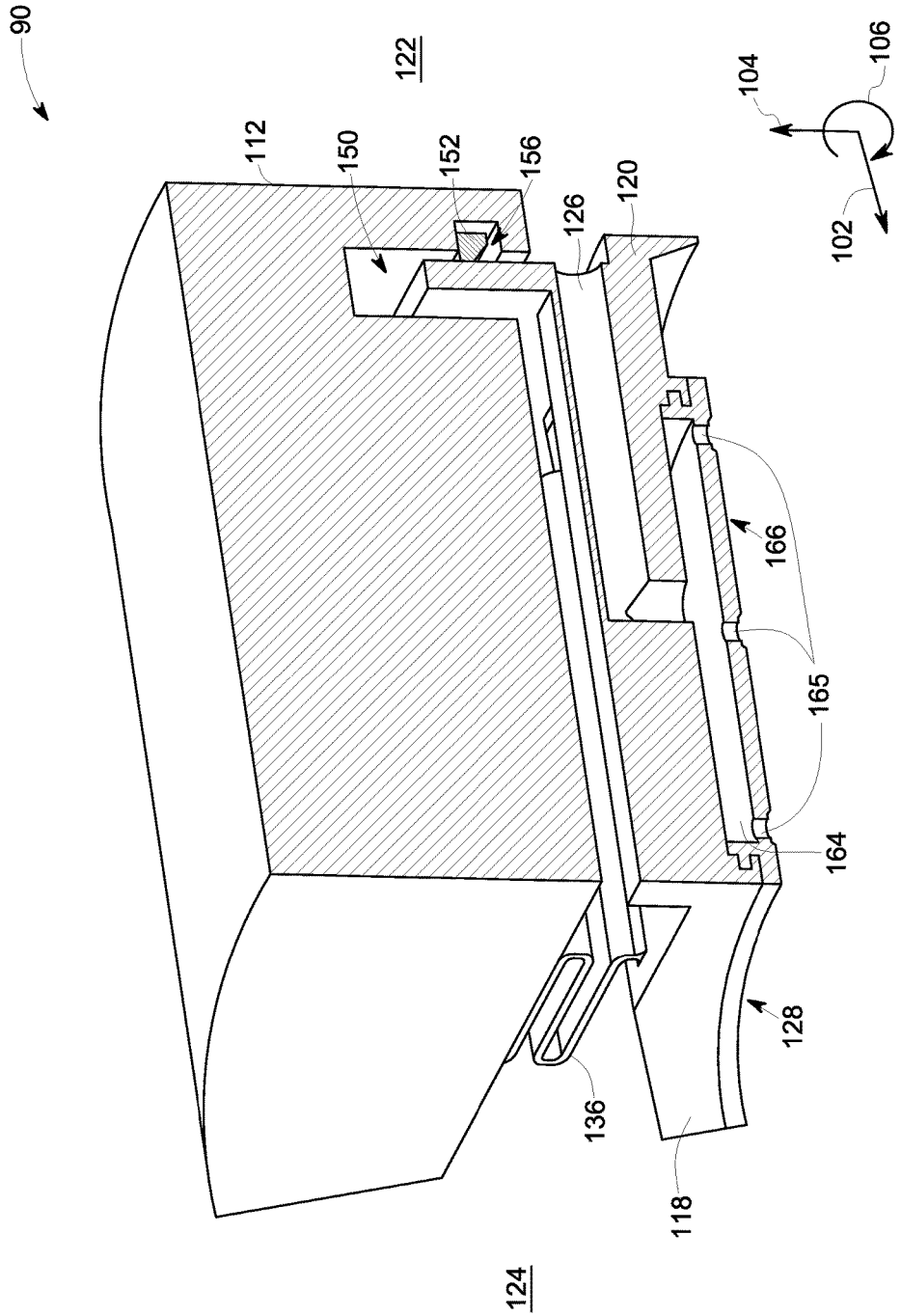
FIG. 9 is a cross-sectional view of a seal segment having a plenum with openings, in accordance with an embodiment of the present specification.

FIG. 9 is a perspective cross-section view 90 of the seal segment 116 having a plenum 164 with openings, in accordance with an embodiment of the present specification. In one embodiment, the plenum 164 may be formed as an integral part of the shoe plate 118. In another embodiment, the plenum 164 may be formed in a separate component 166 that is attachable to the shoe plate 118. For example, the component 166 may be slidable into slots formed in the shoe plate 118. The side of the plenum that faces the rotor forms the load-bearing surface 128.

The plenum 164 is configured to receive the flow of the high pressure fluid from one or more supply ports such as the supply port 126. Moreover, in one embodiment, as depicted in FIG. 9, the plenum 164 may have at least one opening 165 in the load-bearing surface 128 of the shoe plate 118 for directing a flow of the high pressure fluid toward the rotor. It is also contemplated that the at least one opening 165 may have a counter bore (not shown in FIG. 9, but similar to the combination of the feed port 130 and counter bore 131 as depicted in FIG. 3).

Figure 10:
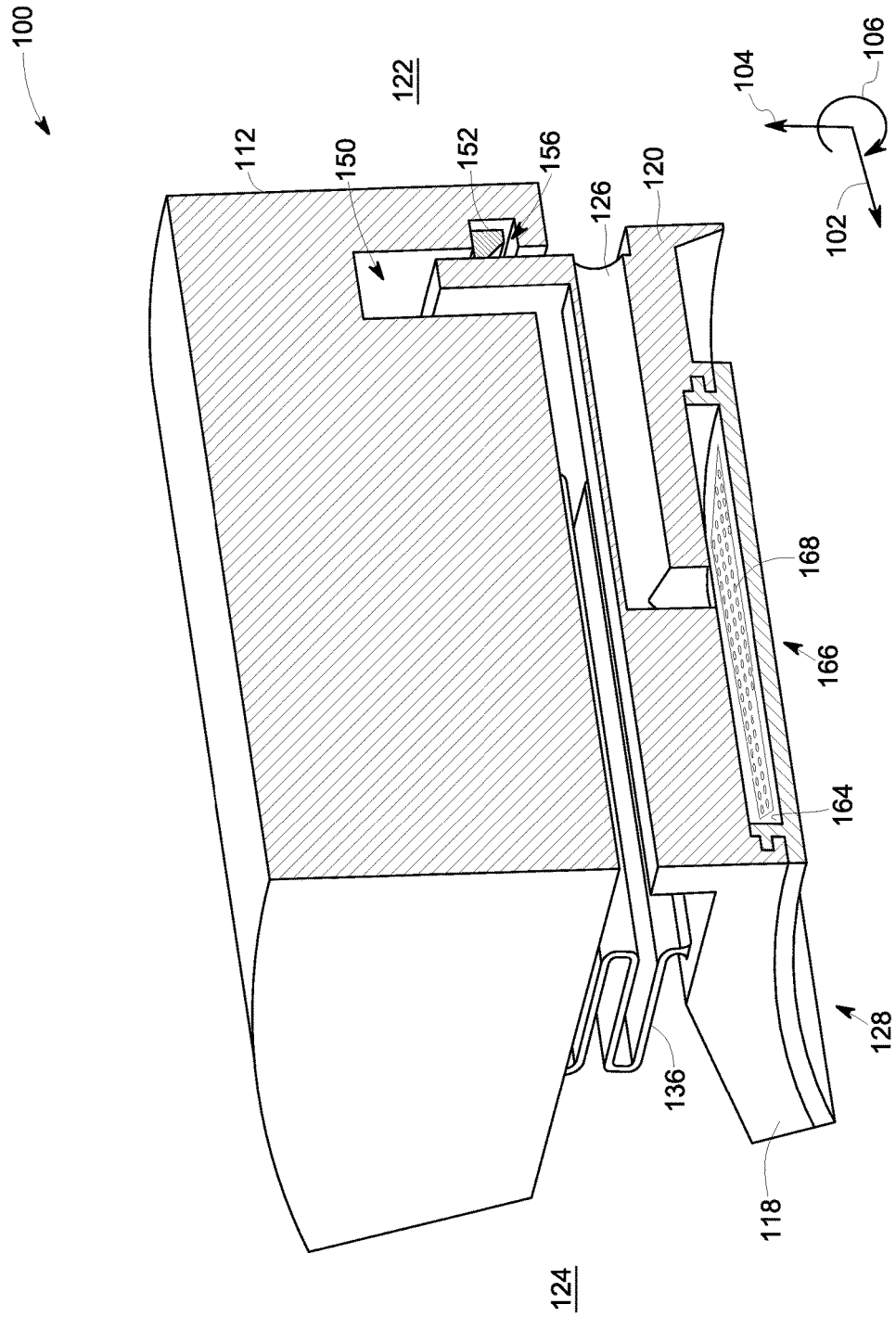
FIG. 10 is a cross-sectional view of a seal segment having a plenum with a porous media, in accordance with an embodiment of the present specification.

In yet another embodiment, as depicted in FIG. 10, the plenum 164 may have a porous media on the side facing the rotor. FIG. 10 is a perspective cross-section view 100 of seal segment having the plenum 164 with a porous media 168, in accordance with an embodiment of the present specification. The supply port 126 discharges the high pressure fluid toward the rotor via the porous media 168 of the plenum 164.

Figure 11:
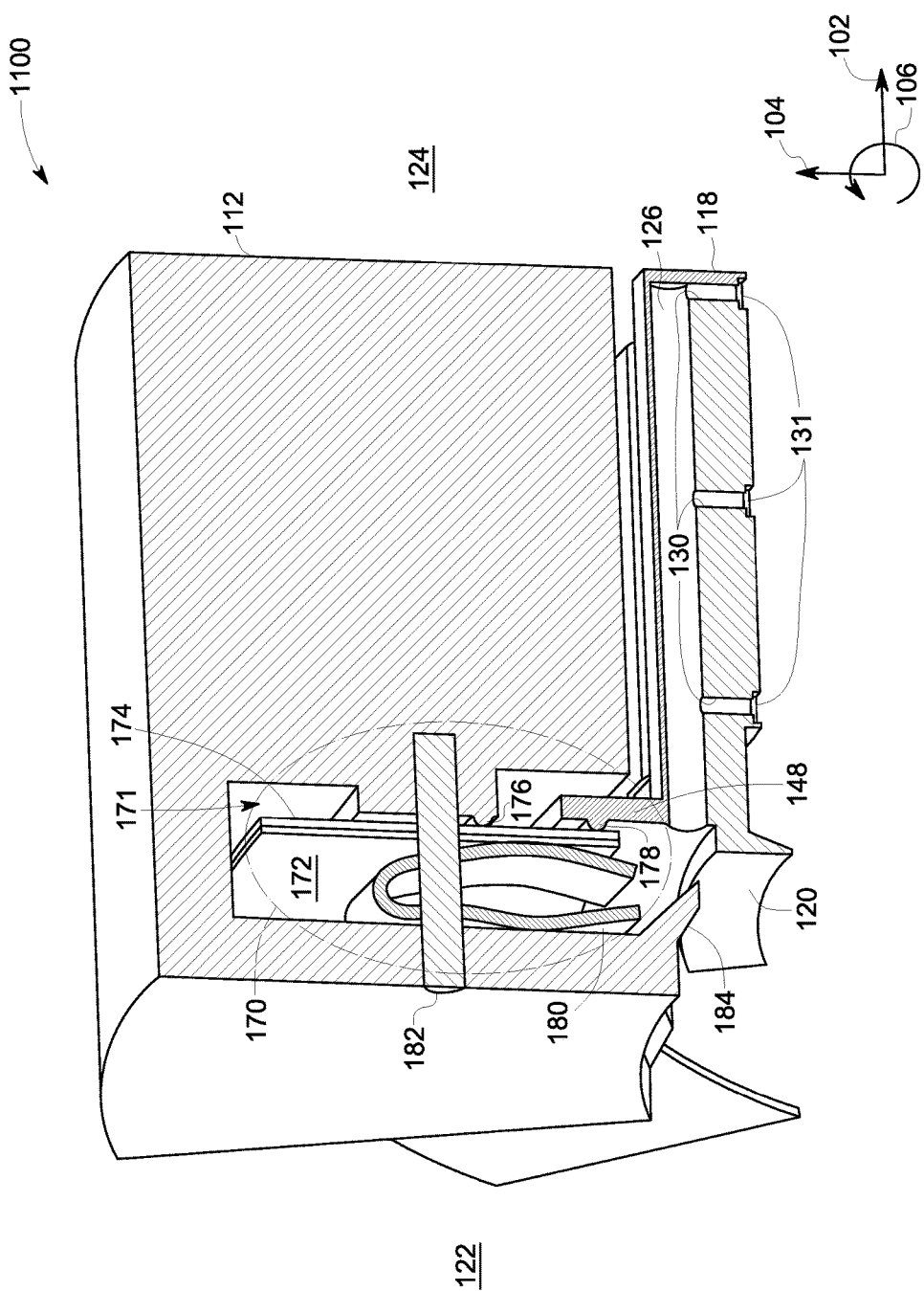
FIG. 11 is a cross-sectional view of seal segment having a leaf seal arrangement as a secondary seal, in accordance with an embodiment of the present specification.

FIG. 11 is a perspective view 1100 of the seal segment 116 having a leaf seal arrangement as a secondary seal 170, in accordance with an embodiment of the present specification. The purpose of the secondary seal 170 is to reduce the leakage of flow through the radial space between the shoe plate 118 and the stator interface 112.

The secondary seal 170 includes arrangement of an outer leaf seal plate 172 and an inner leaf seal plate 174 in a slot 171 formed in the stator interface element 112. More particularly, the outer leaf seal plate 172 and the inner leaf seal plate 174 may not be fixed to the stator interface 112. The outer and inner leaf seal plates 172, 174 are loaded axially against two noses—a radially outer nose 176 of the stator interface element 112 and radially inner nose 178 of the radially extending portion 148. The inner leaf seal plate 174 of a given seal segment is in contact with the radially outer nose 176 and inner nose 178. The outer leaf seal plate 172 may be disposed circumferentially offset from the inner leaf seal plate 174 such that the outer leaf seal plate 172 covers the radial segment gaps between adjacent inner leaf seal plates.

Moreover, one or more flexible elements such as a spring 180 depicted in FIG. 11 are used to load the outer and inner leaf seal plates 172 and 174 toward the noses 176 and 178. On one embodiment, the spring 180 may be arranged to apply a spring force at a pre-defined position on the outer leaf seal plate 172 between the radially outer nose 176 and inner nose 178. For example, the pre-defined position on the outer leaf seal plate 172 may be in middle of the radially outer nose 176 and inner nose 178. As depicted in FIG. 11, the spring 180 may be a u-shape spring. Other types of springs may also be used in place of the u-shape spring without limiting the scope of the present specification. One or more blocking elements such as a pin 182 may be used for supporting the outer and inner leaf seal plates 172, 174, and the spring 180. It is to be noted that in addition to the force applied by the spring 180, the outer leaf 172 also experiences the high pressure 122 that urges the two layers of leaf seals 172 and 174 axially towards the noses 176 and 178.

Contact force between the noses 176, 178 and the outer and inner leaf seal plates 172, 174 includes a normal reaction (due to a force caused by the spring 180 and pressure load) as well as a friction force (due to the radial movement of the radially extending portion 148). Desired values of the normal force are attained by adjusting the stiffness of the spring 180 and the pressure load on one or more of the outer and inner leaf seal plate 172, 174.

Additionally, the stator interface element 112 may be designed to have a protrusion 184. The protrusion 184 reduces the turbulent or dynamic effects of high pressure fluid and improves reliability of the flexible element or spring 180 and the outer leaf 172.

Figure 12:
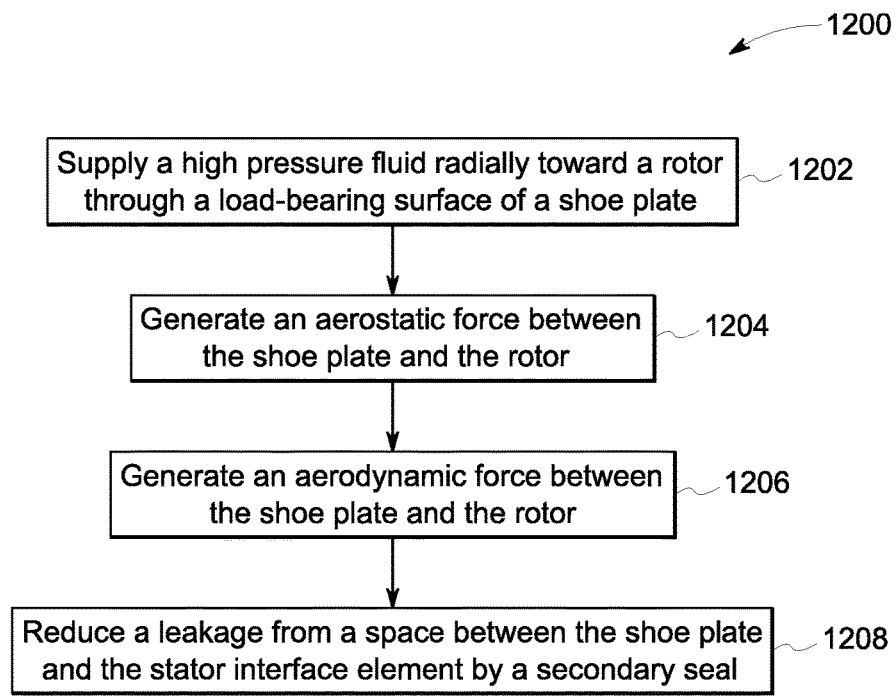
FIG. 12 is flow chart illustrating an example method of operating a seal segment, in accordance with an embodiment of the present specification.

FIG. 12 is flow chart 1200 illustrating an example method of operating a seal segment such as the seal segment 116, in accordance with an embodiment of the present specification. As noted previously, one or more seal segments such as the seal segment 116 may be employed in a rotary machine having the stationary housing 110 and a rotor. Moreover, the seal segment 116 may include the stator interface element 112, the shoe plate 118 having the labyrinth tooth 120, the load-bearing surface 128, and the radially extending portion 148. The method may include following steps:

At step 1202, a high pressure fluid is supplied radially toward the rotor through the load-bearing surface 128 of the shoe plate 118. In one embodiment, supplying the high pressure fluid includes flowing the high pressure fluid through one or more supply ports such as the supply port 126 formed in the shoe plate 118. More particularly, in one embodiment, the high pressure fluid from the supply port 126 is directed toward the rotor via the feed ports 130 and counter bores 131 formed in the load bearing surface 128. In another embodiment, supplying the high pressure fluid includes flowing the high pressure fluid from the supply port 126 via the plenum 164 toward the rotor. More particularly, in one embodiment, the high pressure fluid from the plenum 164 is directed toward the rotor via the at least one opening 165 formed in the load bearing surface 128. In another embodiment, the high pressure fluid from the plenum 164 is directed toward the rotor via the porous media 168 disposed on a side of the plenum facing the rotor. Moreover, as previously noted the plenum 164 may be integral to the shoe plate 118 or formed in the separate component 166 attachable to the shoe plate 118.

If the starting gap between the shoe plate 118 and the rotor is large, for example, more than about 0.005 inches, the forces on the seal segment 116 are such that the seal moves inwards towards the rotor. As the gap between the shoe plate 118 and the rotor becomes small (smaller than about 0.003 inch), the flow of the high pressure fluid from the supply port 126 toward the rotor may lead to generation of an aerostatic force between the shoe plate 118 and the rotor, as indicated by step 1204. If however, the starting gap between the shoe plate 118 and the rotor is zero, then flow of the high pressure fluid from supply port 126 toward the rotor may lead to generation of an aerostatic force causes the shoe to move away from the rotor. As previously noted, application of such aerostatic force avoids any start-up rubs between the shoe plate 118 and the rotor.

In addition to the aerostatic force indicated in step 1204, in the presence of rotational speed and for small gaps, for example, smaller than about 0.002 inches (and as small as about 0.0003 inches), an aerodynamic force is generated between the shoe plate 118 and the rotor, as indicated by step 1206. As previously noted, the fluid film 142 may be monotonically converging or converging-diverging in the direction of rotation (FIG. 4). Presence of such thin fluid film 142 aids in generating the aerodynamic force that moves the shoe plate 118 radially outwards and keeps the rotor from contacting the shoe plate 118. Moreover, some additional aerodynamic force may also be caused due to the presence of various features such as the Rayleigh steps 144 (see FIG. 5), grooves, pockets formed on the load-bearing surface 128 of the shoe plate 118, and/or or grooves, and/or pockets on the rotor. Consequently, during an operation of the rotary machine, the presence of the aerostatic and aerodynamic forces aid in ensuring a compliant primary sealing where the shoe plates of each seal segment rides on the thin fluid film 142.

Additionally, at step 1208, a leakage from a space between the shoe plate 118 and the stator interface element 112 may also be prevented or reduced due to the presence of a secondary seal. In one embodiment, the contact between radially extending portion 148 and the portion of the ring 152 may lead the secondary seal such as the secondary seal 154. In another embodiment, of the contact between the radially inner nose 178 formed on the radially extending portion 148, radially outer nose 176 of the stator interface element 112, and the inner leaf seal plate 174 may form the secondary seal such as the secondary seal 170.

Any of the foregoing steps and/or system elements may be suitably replaced, reordered, or removed, and additional steps and/or system elements may be inserted, depending on the needs of a particular application, and that the systems of the foregoing embodiments may be implemented using a wide variety of suitable processes and system elements.

In accordance with some embodiments of the invention, the described seal assembly may be operated with both aerostatic and aerodynamic modes of operation, which increases load-bearing capacity of the seal assembly. Moreover, the use of the supply ports may also aid in cooling of the shoe plate. Any leakage between neighboring seal segments may also be reduced by the use of the splines seals. Furthermore, suitable arrangement of the feed ports and counter bores leads to either a uniform lift of the shoe plate (where the shoe plate 118 is parallel to the rotor) or allow for the correction of tilt of the shoe plate 118 (where, for example, the forward edge of the shoe plate 118 is closer to the rotor than the aft edge of the shoe plate 118). Additionally, various types of secondary seal arrangements as described herein may reduce or prevent the leakage of fluid from a space between the stator interface element and the shoe plate.

Furthermore, those skilled in the art will recognize the interchangeability of various features from different embodiments. Similarly, the various method steps and features described, as well as other known equivalents for each such methods and feature, can be mixed and matched by one of ordinary skill in this art to construct additional systems and techniques in accordance with principles of this disclosure. Of course, it is to be understood that not necessarily all such objects or advantages described above may be achieved in accordance with any particular embodiment. Thus, for example, those skilled in the art will recognize that the systems and techniques described herein may be embodied or carried out in a manner that achieves or optimizes one advantage or group of advantages as taught herein without necessarily achieving other objects or advantages as may be taught or suggested herein.

While only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:

1. A seal assembly for a rotary machine, the seal assembly comprising:
   a plurality of seal segments disposed circumferentially intermediate to a stationary housing and a rotor, and a ring, wherein the rotor comprises a stepped section comprising a first portion of the rotor with a decreased radius for a predefined length, and wherein each of the plurality of seal segments comprises:
   a stator interface element;
   a portion of the ring movably supported into the stator interface element; and
   a shoe plate movably supported by the stator interface element, wherein the shoe plate comprises:
      one or more labyrinth teeth, wherein the first portion of the rotor with the decreased radius faces and is radially opposite the one or more labyrinth teeth;
      a load-bearing surface radially offset from the one or more labyrinth teeth;
      one or more supply ports formed in the shoe plate for facilitating supply of high pressure fluid toward the rotor; and
      a radially extending portion that extends toward the stator interface element, wherein the radially extending portion is in contact with the portion of the ring,
      wherein the shoe plate is arranged such that the load-bearing surface faces and is radially opposite to at least a second portion of the rotor having an increased radius compared to the stepped section.

2. The seal assembly of claim 1, wherein each of the plurality of seal segments further comprises one or more flexible elements disposed between the shoe plate and the stator interface element, and wherein the one or more flexible elements are configured for aiding a radial movement of the shoe plate relative to the stator interface element.

3. The seal assembly of claim 2, wherein the one or more flexible elements comprises bellows springs or flexures.

4. The seal assembly of claim 1, wherein the one or more supply ports are formed axially into the shoe plate.

5. The seal assembly of claim 1, wherein each of the one or more supply ports comprises at least one opening in the load-bearing surface for directing a flow of the high pressure fluid toward the rotor.

6. The seal assembly of claim 1, wherein the load bearing surface is coated with a lubricating coating including a lubricant embedded in a hard material selected from the group consisting of graphite, diamond-like carbon, hexagonal boron nitride, chromium molybdenum nitride, chrome titanium aluminum nitride, and combinations thereof.

7. The seal assembly of claim 1, wherein the shoe plate comprises a plenum for receiving the high pressure fluid from the one or more supply ports, and wherein a side of the plenum that faces the rotor forms the load-bearing surface.

8. The seal assembly of claim 7, wherein the plenum is formed in a component attachable to the shoe plate.

9. The seal assembly of claim 8, wherein the component is slidable into the shoe plate.

10. The seal assembly of claim 7, wherein the plenum is integral to the shoe plate.

11. The seal assembly of claim 7, wherein the side of the plenum that faces the rotor comprises at least one opening for directing a flow of the high pressure fluid radially toward the rotor.

12. The seal assembly of claim 7, wherein the side of the plenum that faces the rotor comprises a porous media for directing a flow of the high pressure fluid toward the rotor.

13. The seal assembly of claim 1, wherein each shoe plate further comprises a crossover hole between the one or more labyrinth teeth and the load-bearing surface, wherein the crossover hole is in fluid communication with a cavity between the stator interface element and the shoe plate and is angled to allow a flow of low pressure fluid in a circumferential direction to swirl the flow of low pressure fluid.

14. The seal assembly of claim 1, wherein the ring is disposed in a slot formed in the stator interface element.

15. The seal assembly of claim 1, wherein the radially extending portion comprises one or more slots on at least one side for allowing disposal of at least one spline seal shim for reducing leakage between neighboring seal segments.

16. The seal assembly of claim 1, wherein the one or more supply ports are configured to generate at least one of an aerostatic force or an aerodynamic force between the shoe plate and the rotor based on at least one of the supply of high pressure fluid towards the rotor, a curvature mismatch between the shoe plate and the rotor, and grooves or Rayleigh steps present on the shoe plate or the rotor.

17. The seal assembly of claim 11, wherein the at least one opening comprises a counterbore formed in the load-bearing surface.

18. The seal assembly of claim 2, wherein the one or more flexible elements are brazed to the shoe plate and the stator interface element.

19. The seal assembly of claim 18, wherein the ring has a polygonal cross section.

* * * * *